US011563992B2

(12) United States Patent
Liu

(10) Patent No.: US 11,563,992 B2
(45) Date of Patent: Jan. 24, 2023

(54) VIDEO PLAYBACK QUALITY DETECTION METHOD AND APPARATUS

(71) Applicant: HUAWEI TECHNOLOGIES CO., LTD., Guangdong (CN)

(72) Inventor: Xiaodong Liu, Beijing (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 0 days.

(21) Appl. No.: 17/136,672

(22) Filed: Dec. 29, 2020

(65) Prior Publication Data

US 2021/0120292 A1    Apr. 22, 2021

Related U.S. Application Data

(63) Continuation of application No. PCT/CN2019/091619, filed on Jun. 18, 2019.

(30) Foreign Application Priority Data

Jun. 30, 2018 (CN) .......................... 201810704809.0

(51) Int. Cl.
*H04N 21/24*    (2011.01)
*H04L 29/06*    (2006.01)
(Continued)

(52) U.S. Cl.
CPC ......... *H04N 21/2402* (2013.01); *H04L 65/80* (2013.01); *H04N 21/2407* (2013.01); *H04N 21/2662* (2013.01); *H04N 21/44004* (2013.01)

(58) Field of Classification Search
CPC ........ H04N 17/00; H04N 21/44; H04N 21/24; H04N 21/64723; H04N 21/2402;
(Continued)

(56) References Cited

U.S. PATENT DOCUMENTS 9,326,046 B1    4/2016 Park et al.
2010/0043038 A1*  2/2010 Li ..................... H04N 21/2368
                                                              348/559
(Continued)

FOREIGN PATENT DOCUMENTS

CN    101426146 A    5/2009
CN    101523916 A    9/2009
(Continued)

OTHER PUBLICATIONS

Wubin Pan et al, Towards QoE Assessment of Encrypted YouTube Adaptive Video Streaming in Mobile Networks, 2016 IEEE/ACM 24th International Symposium On Quality of Service (IWQOS), IEEE, Jun. 20, 2016, 6 pages.
(Continued)

*Primary Examiner* — Tonia L Dollinger
*Assistant Examiner* — Mehulkumar J Shah
(74) *Attorney, Agent, or Firm* — Womble Bond Dickinson (US) LLP

(57) ABSTRACT

Video playback quality detection methods, systems, and apparatuses are described. The method can include obtaining a first video data packet of a target video from a bearer network and obtaining a data byte quantity of first video data included in the first video data packet. The method may also include determining a buffer byte quantity stored in a video quality detection buffer. Furthermore, the method can include obtaining video frame data rate information corresponding to the target video and reducing the buffer byte quantity stored in the video quality detection buffer based on a video frame rate of the target video and the video frame data rate information of the target video. The method may further include determining a playback status of playing the target video on a video player, and determining video playback quality of the target video based on the playback (Continued)

status. According to the embodiments of the present invention, user experience and accuracy of the video playback quality detection method can be improved.

15 Claims, 6 Drawing Sheets

(51) Int. Cl.
*H04N 21/2662* (2011.01)
*H04L 65/80* (2022.01)
*H04N 21/44* (2011.01)

(58) Field of Classification Search
CPC .......... H04N 21/2662; H04N 21/2401; H04N 21/2407; H04N 21/44004; H04N 17/004; H04N 21/44008; H04N 21/647; H04L 65/80; H04L 28/02; H04L 29/06
USPC ........................................................ 709/231
See application file for complete search history.

(56) References Cited

U.S. PATENT DOCUMENTS

| | | | | |
|---|---|---|---|---|
| 2011/0314095 | A1* | 12/2011 | Gupta | ............. H04N 21/44012 709/203 |
| 2012/0110167 | A1 | 5/2012 | Joch et al. | |
| 2012/0173751 | A1* | 7/2012 | Braness | ................. H04N 19/40 709/231 |
| 2013/0166623 | A1* | 6/2013 | Stanwood | ............... H04W 4/00 709/202 |
| 2013/0182177 | A1 | 7/2013 | Furlan | |
| 2013/0297743 | A1* | 11/2013 | Eschet | ................. H04L 65/756 709/219 |
| 2014/0082146 | A1* | 3/2014 | Bao | ..................... H04L 43/0882 709/219 |
| 2016/0150228 | A1 | 5/2016 | Greene | |

FOREIGN PATENT DOCUMENTS

| | | |
|---|---|---|
| CN | 103702240 A | 4/2014 |
| CN | 104639955 A | 5/2015 |
| CN | 104717555 A | 6/2015 |
| CN | 105491403 A | 4/2016 |
| CN | 105657498 A | 6/2016 |
| CN | 106851341 A | 6/2017 |
| WO | 2013188186 A1 | 12/2013 |

OTHER PUBLICATIONS

ITU-T H.264, (Apr. 2017), Series H: Audiovisual and Multimedia Systems, Infrastructure of audiovisual services—Coding of moving video, Advanced video coding for generic audiovisual services, total 812 pages.

\* cited by examiner

VIDEO PLAYBACK QUALITY DETECTION METHOD AND APPARATUS

CROSS-REFERENCE TO RELATED APPLICATIONS

This application is a continuation of International Application No. PCT/CN2019/091619, filed on Jun. 18, 2019, which claims priority to Chinese Application No. 201810704809.0, filed on Jun. 30, 2018. The disclosures of the aforementioned applications are hereby incorporated by reference in their entireties.

TECHNICAL FIELD

The present description relates to the field of communications technologies, and in particular, to a video playback quality detection method and a detection apparatus.

BACKGROUND

With the continuous development of science and technology, a network video service has achieved breakthrough development, and has become a basic service of major operators. With the continuous popularization of the video service, a playback quality requirement of people for the video service is constantly increasing. For example, the people require higher video definition and better video playback quality. Therefore, how to ensure video playback quality of the video service has become a major research hotspot in the field of video service technologies.

In an existing video playback quality detection method, video playback quality is generally determined based on video playback quality feedback information or fault report information that is actively sent by a user, and then fault location, fault isolation, and fault correction are performed on the video service in time, to improve service quality of the video service. However, the existing video playback quality detection method is based on the information actively fed back by the user. If the information fed back by the user is not timely or accurate, real-time quality and accuracy of the playback quality detection method are reduced. Therefore, user experience is poor and an accuracy rate is low in the existing video playback quality detection method.

SUMMARY

Embodiments of the present invention provide a video playback quality detection method and a detection apparatus, to improve user experience and accuracy of video playback quality detection.

According to a first aspect, an embodiment of the present invention provides a video playback quality detection method. This method is applicable to video playback quality detection of a target video. The target video is transmitted by a video resource server to a video player. A first video data packet of the target video is obtained from a bearer network. Then, a data byte quantity of first video data included in the first video data packet is obtained. Then, a buffer byte quantity stored in a video quality detection buffer is determined based on the video byte quantity. Herein, the bearer network is a network that is between the video resource server and the video player and that is used to transmit the target video, and the target video corresponds to a plurality of video data packets including the first video data packet. Video frame data rate information corresponding to the target video is obtained. The buffer byte quantity stored in the video quality detection buffer is reduced based on a video frame rate of the target video and the video frame data rate information of the target video. Herein, the video frame data rate information includes single frame data rate information corresponding to each of some or all video frames in the target video. The single frame data rate information corresponding to any video frame includes at least a data rate byte quantity and a data rate information identifier that correspond to any video frame. Then, a playback status of playing the target video on the video player is determined based on the reduced buffer byte quantity stored in the video quality detection buffer. Finally, video playback quality of the target video is determined based on the playback status.

In this embodiment of the present invention, the buffer byte quantity stored in the video quality detection buffer is adjusted in real time based on data byte data corresponding to the video data packet of the target video and the video frame data rate information of the target video, so that the buffer byte quantity stored in the video quality detection buffer can accurately reflect in real time an actual buffer amount of video data in a process of playing the target video on the video player. Therefore, the playback quality of playing the target video on the video player can be accurately detected based on the buffer byte quantity stored in the video quality detection buffer. Based on the foregoing operations, real-time quality and accuracy of the video quality detection method can be improved, and user experience of the video quality detection method can be improved.

In embodiments of some feasible implementations, video attribute information of the target video may be obtained, and then a video identifier of the target video may be determined based on the video attribute information. Herein, the video attribute information may include a video identifier, an encoding mode, a video frame rate, video duration, a value of a video data rate, and the like. This is not limited herein. One video identifier uniquely corresponds to one video. If target decoded video information is obtained from a data rate information cloud server through matching based on the video identifier, the video frame data rate information corresponding to the target video is determined based on the target decoded video information. Herein, the data rate information cloud server includes one or more groups of decoded video information, and one group of decoded video information includes at least a video identifier and video frame data rate information of one video. The video frame data rate information of the target video is obtained from the data rate information cloud server based on the video identifier of the target video. This method is simple and easy to implement. A data processing amount in the video playback quality detection method can be reduced, and efficiency of the video playback quality detection method can be improved.

In embodiments of some feasible implementations, a video playback quality detection apparatus includes a data rate information buffer. If target decoded video information is not obtained from a data rate information cloud server through matching based on the video identifier, the video frame data rate information corresponding to the target video may be obtained from the data rate information buffer. Herein, the video frame data rate information is determined based on some or all decoded video frames corresponding to the target video and stored in the data rate information buffer, and the some or all decoded video frames corresponding to the target video are obtained by decoding video data included in some or all video data packets corresponding to the target video.

In embodiments of some feasible implementations, second video data included in a second video data packet corresponding to the target video may be obtained. Then, a target decoding mode is determined based on a video encoding type. The second video data is decoded in the target decoding mode. Then, single frame data rate information of a plurality of video frames corresponding to the second video data packet is determined based on the decoded second video data. Finally, the single frame data rate information of the plurality of video frames corresponding to the second video data packet is stored in the data rate information buffer, to update the video frame data rate information that is of the target video and that is stored in the data rate information buffer. Herein, the second video data packet corresponding to the target video may represent any one of the plurality of video data packets corresponding to the target video. Video data in a video data packet of the target video is decoded, and the video frame data rate information of the target video is determined based on the decoded video data. In this way, the buffer byte quantity that is stored in the video quality detection buffer and that is reduced based on the video frame data rate information of the target video can be subsequently more accurate, thereby improving accuracy of the video playback quality detection method.

In embodiments of some feasible implementations, the decoded second video data includes a plurality of decoded video frames. The following operations may be performed on any decoded video frame i in the plurality of decoded video frames:

A picture data rate byte quantity and an audio data rate byte quantity that correspond to the decoded video frame i are obtained. The picture data rate byte quantity and the audio data rate byte quantity are combined into a single frame data rate byte quantity corresponding to the decoded video frame i. A frame identifier corresponding to the decoded video frame i is obtained. A data rate information identifier corresponding to the decoded video frame i is determined based on the frame identifier corresponding to the decoded video frame i.

Finally, the single frame data rate information of the plurality of video frames corresponding to the second video data packet is determined based on each single frame data rate byte quantity corresponding to each of the plurality of decoded video frames and each data rate information identifier corresponding to each decoded video frame.

In embodiments of some feasible implementations, the video frame data rate information that is of the target video and that is stored in the data rate information buffer may be transmitted to the data rate information cloud server, to store, in the data rate information cloud server, the video frame data rate information corresponding to the target video. The video frame data rate information corresponding to the target video is stored in the data rate information cloud server, to update video frame data rate data stored in the data rate information cloud server. In this way, the video frame data rate information of the target video can be directly obtained from the data rate information cloud server in a next time of performing video playback quality detection on the target video.

In embodiments of some feasible implementations, at the expiration of a first reduction cycle determined based on the video frame rate of the target video, a first video frame corresponding to a start moment of the target video may be determined. Then, first single frame data rate information corresponding to the first video frame is determined based on the video frame data rate information of the target video.

Then, a first data rate byte quantity included in the first single frame data rate information may be obtained. The buffer byte quantity stored in the video quality detection buffer is reduced by a value corresponding to the first data rate byte quantity, to obtain the reduced buffer byte quantity stored in the video quality detection buffer.

In embodiments of some feasible implementations, at the expiration of a second reduction cycle after the first reduction cycle, the first single frame data rate information corresponding to the first reduction cycle may be obtained. Then, a second data rate information identifier is determined based on a first data rate information identifier included in the first single frame data rate information. Second single frame data rate information is determined, based on the second data rate information identifier, from the video frame data rate information corresponding to the target video. Then, a second data rate byte quantity included in the second single frame data rate information is obtained. The buffer byte quantity stored in the video quality detection buffer is reduced by a value corresponding to the second data rate byte quantity, to obtain the reduced buffer byte quantity stored in the video quality detection buffer. The buffer byte quantity stored in the video quality detection buffer is reduced based on the single frame data rate information in the video frame data rate information of the target video, so that the reduced buffer byte quantity stored in the video quality detection buffer can accurately reflect in real time an actual buffer amount of video data in a process of playing the target video on the video player.

In embodiments of some feasible implementations, the playback status includes a stalling state. If the reduced buffer byte quantity stored in the video quality detection buffer is less than or equal to a stalling byte quantity threshold, it is determined that the playback status of the target video is the stalling state.

In embodiments of some feasible implementations, when it is determined that the playback status of the target video is the stalling state, a quantity of stalling times that corresponds to the target video may be determined. Then, if the quantity of stalling times that corresponds to the target video is greater than or equal to a first preset quantity threshold, it may be determined that video playback quality of the target video is poor. Alternatively, when the quantity of stalling times that corresponds to the target video is greater than or equal to a second preset quantity threshold at the expiration of a preset detection period, it may be determined that the video playback quality of the target video is poor. The video playback quality of the target video is determined based on the quantity of stalling times that corresponds to the target video. This method is simple and easy to implement. In this way, efficiency and applicability of the video playback quality detection method can be improved.

In embodiments of some feasible implementations, when it is determined that the playback status of the target video is the stalling state, the step of reducing, based on the video frame rate of the target video and the video frame data rate information of the target video, the buffer byte quantity stored in the video quality detection buffer may be stopped. When the buffer byte quantity stored in the video quality detection buffer is greater than or equal to a fluent byte quantity threshold, it is determined to switch the playback status of the target video from the stalling state to a fluent state. Then, the step of reducing, based on the video frame rate of the target video and the video frame data rate information of the target video, the buffer byte quantity stored in the video quality detection buffer is continued to perform. In addition, total stalling duration of the target video is updated based on duration of switching the playback status of the target video from the stalling state to the fluent state. If the total stalling duration of the target video is greater than or equal to first preset stalling duration, it is determined that the video playback quality of the target video is poor. Alternatively, if the total stalling duration of the target video is greater than or equal to second preset stalling duration at the expiration of a preset detection period, it is determined that the video playback quality of the target video is poor. The video playback status of the target video is determined based on the total stalling duration of the target video. In this way, misjudgment caused by a small quantity of stalling times but excessive total stalling duration can be avoided, thereby improving accuracy of the video playback quality detection method.

According to a second aspect, an embodiment of the present invention provides a video playback quality detection apparatus. The detection apparatus includes a unit configured to perform the video playback quality detection method provided in any one of the foregoing possible implementations of the first aspect. Therefore, the detection apparatus may implement beneficial effects (or advantages) of the video playback quality detection method provided in the first aspect.

According to a third aspect, an embodiment of the present invention provides a data rate information cloud server. The data rate information cloud server includes a cloud processor and a cloud memory. The cloud memory stores one or more groups of decoded video information. The one or more groups of decoded information are used to determine a video identifier and video frame data rate information of each of one or more videos including a target video. The cloud processor is configured to:

receive a query request sent by a video playback quality detection apparatus, where the query request includes a video identifier of the target video; search the cloud memory for target decoded video information based on the video identifier of the target video; and then, send the target decoded video information to the video playback quality detection apparatus, where the target decoded video information is used to determine video frame data rate information of the target video, the video frame data rate information of the target video is used to determine a reduced buffer byte quantity stored in a video quality detection buffer, and the reduced buffer byte quantity stored in the video quality detection buffer is used to determine video playback quality of the target video.

In this embodiment of the present invention, the video frame data rate information of the target video is stored and shared by using the data rate information cloud server, thereby reducing a data processing amount in a video playback quality detection method and improving efficiency of the video playback quality detection method.

In embodiments of some feasible implementations, if the target decoded video information cannot be found, the cloud processor is further configured to send a query failure notification to the video playback quality detection apparatus.

In embodiments of some feasible implementations, the cloud processor is further configured to:

obtain video data of the target video; and decode the video data based on a video encoding type of the target video, and determine, based on the decoded video data, single frame data rate information of a plurality of video frames corresponding to a video data packet; and store, in the cloud memory, the single frame data rate information of the plurality of video frames corresponding to the video data packet.

In embodiments of some feasible implementations, the data rate information cloud server is connected to a plurality of video playback quality detection apparatuses. If the target decoded video information cannot be found, the cloud processor is further configured to: obtain a decoding load parameter of each of the plurality of video playback quality detection apparatuses; determine one or more idle video playback quality detection apparatuses in the plurality of video playback quality detection apparatuses based on the decoding load parameter of each video playback quality detection apparatus; and determine a target idle video playback quality detection apparatus from the one or more idle video playback quality detection apparatuses, and determine the video frame data rate information of the target video by using the target idle video playback quality detection apparatus. A video playback quality detection apparatus with a minimum decoding load is selected from the plurality of video playback quality detection apparatuses connected to the data rate information cloud server to determine the video frame data rate information of the target video, to fully use a video decoding capability of the plurality of video playback quality detection apparatuses, thereby improving efficiency of the video playback quality detection method.

In embodiments of some feasible implementations, the cloud processor is configured to receive and store the video frame data rate information that is of the target video and that is sent by the video playback quality detection apparatus. Herein, the video frame data rate information of the target video is stored in a data rate information buffer in the video playback quality detection apparatus.

According to a fourth aspect, an embodiment of the present invention provides a video playback quality detection system. The video playback quality detection system includes a video resource server, the data rate information cloud server according to the third aspect, and one or more video playback quality detection apparatuses according to the first aspect. Herein, the video resource server is configured to store a plurality of videos including at least a target video. The video resource server is also configured to provide one or more videos in the plurality of videos for the video playback quality detection apparatus by using a bearer network.

In embodiments of some feasible implementations, a video player is configured to obtain a video from the video resource server by using the bearer network.

According to a fifth aspect, an embodiment of this application provides an electronic device. The electronic device may be a terminal device or another type of computer device. The electronic device includes a memory and a processor, and may further include an input/output device, a communications interface, and the like. The memory is configured to store a group of program code. The processor is configured to invoke the program code stored in the memory to perform the video playback quality detection method provided in any possible implementation of the first aspect. Therefore, the processor may implement beneficial effects of the video playback quality detection method provided in the first aspect.

According to a sixth aspect, an embodiment of this application provides a computer readable-storage medium. The computer-readable storage medium stores an instruction. When the instruction is run on a computer, the computer is enabled to perform the video playback quality detection method provided in any possible implementation of the first aspect, and to implement beneficial effects of the video playback quality detection method provided in the first aspect.

According to a seventh aspect, an embodiment of this application provides a computer program product including an instruction. When the computer program product is run on a computer, the computer is enabled to perform the video playback quality detection method provided in the first aspect, and to implement beneficial effects of the video playback quality detection method provided in the first aspect.

In the embodiments of the present invention, user experience and accuracy of video quality detection can be improved.

BRIEF DESCRIPTION OF DRAWINGS

To describe the technical solutions in embodiments of this application or in the prior art more clearly, the following briefly describes the accompanying drawings for describing the embodiments or the prior art.

DESCRIPTION OF EMBODIMENTS

The technical solutions according to the embodiments of the present invention are clearly described in the following with reference to the accompanying drawings.

A video playback quality detection method provided in the embodiments of the present invention may be implemented by a video playback quality detection apparatus that is independent of a video resource server and a video player and that has a data processing capability. The video playback quality detection apparatus may be a terminal device that has a data processing capability, or may be a function entity that can execute a data processing process. The terminal device may be a conventional terminal device, or may be a cloud terminal device. This is not limited herein. In the embodiments of the present invention, the video playback quality detection method provided in the present invention is described by using the video playback quality detection apparatus as an execution entity.

Figure 1:
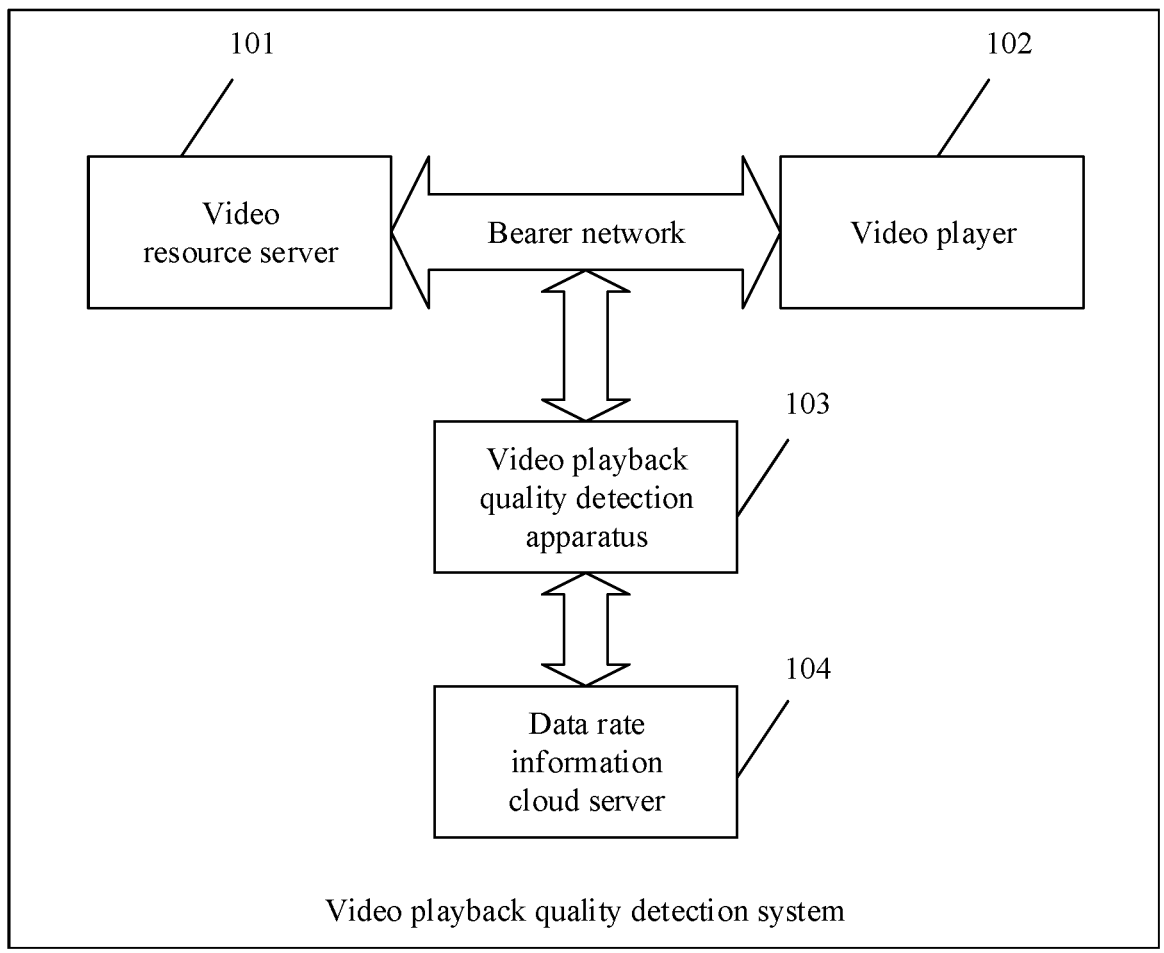
FIG. 1 is a schematic structural diagram of a video playback quality detection system according to an embodiment of the present invention.

FIG. 1 is a schematic structural diagram of a video playback quality detection system according to an embodiment of the present invention. The video playback quality detection system includes a video resource server 101, a video player 102, a video playback quality detection apparatus 103 described in Embodiment 2, and a data rate information cloud server 104 described in Embodiment described in FIG. 6.

In embodiments of some feasible implementations, the video resource server 101 may be configured to store a plurality of videos including at least a target video. The video player 102 may send a video playback request to the video resource server 101 by using a bearer network based on a user operation instruction received by the video player 102. Then, the video resource server 101 responds to the video playback request sent by the video player 102, and sends, to the video player 102 by using the bearer network, a video determined based on the video playback request. The video player 102 may obtain the video from the video resource server 101 by using the bearer network, and play the video. The bearer network is a network that is between the video resource server 101 and the video player 102 and that is used for video transmission or signaling exchange. Herein, a video may be transmitted in the bearer network in a form of a video data packet. A type of the video data packet may be an http data packet. A video in transmission may correspond to a plurality of video data packets. This is not limited herein.

In embodiments of some feasible implementations, when it is detected that the video resource server 101 sends the to-be-detected target video to the video player 102 by using the bearer network, the video playback quality detection apparatus 103 may obtain one or more video data packets of the target video from the bearer network by using a mirror port, an optical splitter, or another method, obtain video frame data rate information of the target video based on the video data packet of the target video, and then detect, based on the video frame data rate information of the target video, a playback status of playing the target video on the video player 102. For embodiments of a specific detection process, refer to a video playback quality detection process described in Embodiment 1. Details are not described herein.

In embodiments of some feasible implementations, the data rate information cloud server 104 stores one or more groups of decoded video information. The one or more groups of decoded information are used to determine a video identifier and video frame data rate information of each of one or more videos including the target video. The data rate information cloud server 104 may be configured to receive a query request sent by the video playback quality detection apparatus 103. The query request includes the video identifier of the target video. Then, target decoded video information is searched for based on the video identifier of the target video. After the target decoded video information is found, the target decoded video information is sent to the video playback quality detection apparatus 103. For embodiments of a specific searching process, refer to a searching process described in Embodiment 1. Details are not described herein.

Embodiment 1

Figure 2:
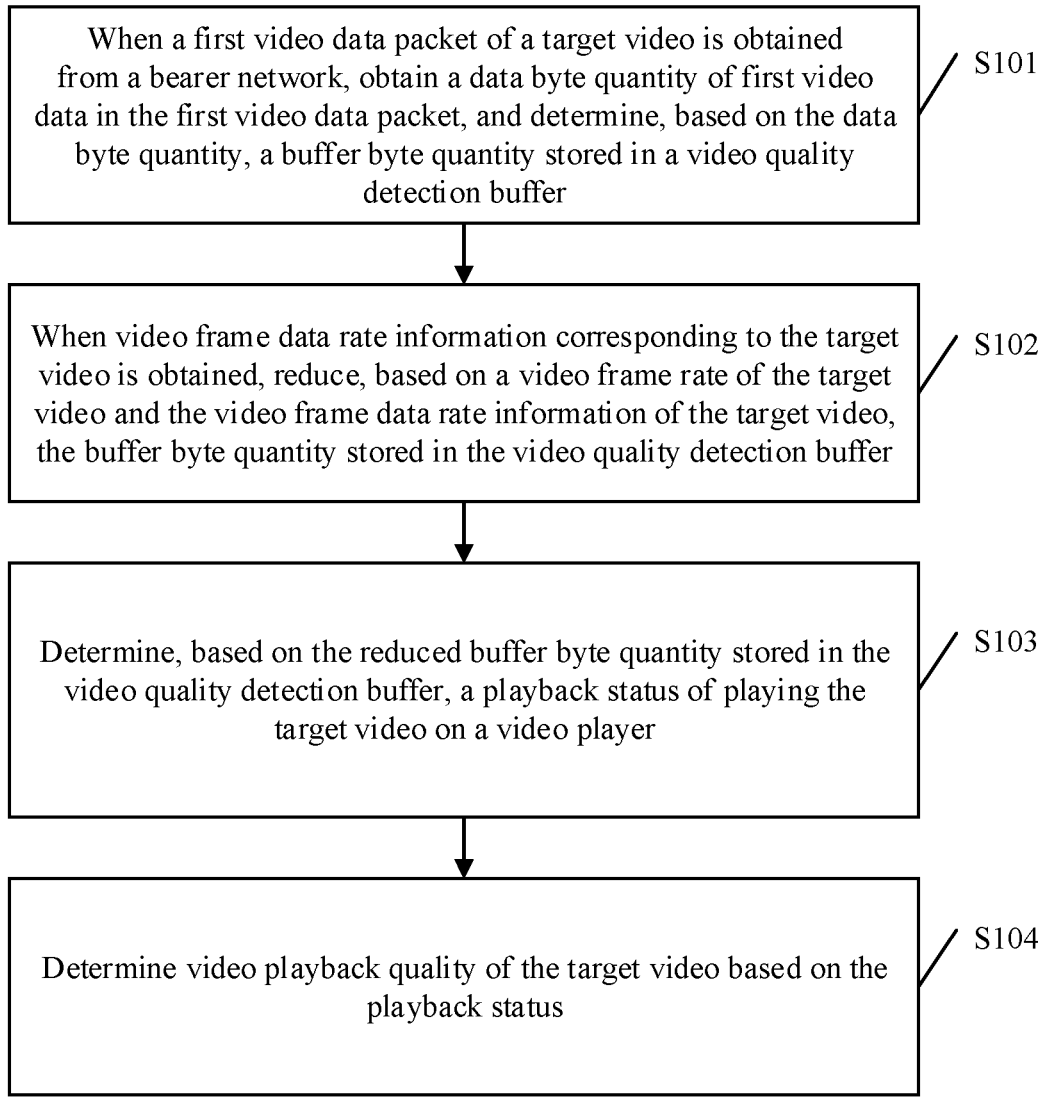
FIG. 2 is a schematic flowchart of a video playback quality detection method according to an embodiment of the present invention.

FIG. 2 is a schematic flowchart of a video playback quality detection method according to an embodiment of the present invention. The video playback quality detection method provided in this embodiment of the present invention is applicable to the foregoing video playback quality detection system. The video playback quality detection method provided in this embodiment of the present invention may include the following steps.

S101. Obtain a first video data packet of a target video from a bearer network, obtain a data byte quantity of first video data in the first video data packet, and determine, based on the data byte quantity, a buffer byte quantity stored in a video quality detection buffer.

In embodiments of some feasible implementations, a video playback quality detection apparatus may monitor in real time whether a video player sends, to a video resource server, a video playback request used to obtain the target video. The target video is a to-be-detected video. If the video playback quality detection apparatus finds the video playback request through monitoring, the video playback quality detection apparatus may obtain the first video data packet of the target video from the bearer network when the video resource server sends the target video to the video player. The target video may correspond to a plurality of video data packets. The first video data packet may represent any one of the plurality of video data packets. Optionally, the video playback quality detection apparatus may obtain the first video data packet of the target video from the bearer network in a port mirroring manner. For example, the video playback quality detection apparatus may set a mirror port on an output port at a core layer device of the bearer network, and copy and obtain, by using the mirror port, the first video data packet of the target video transmitted by using the bearer network. Optionally, the video playback quality detection apparatus may alternatively obtain the first video data packet of the target video from the bearer network by using an optical splitter. The video playback quality detection apparatus obtains the first video data packet of the target video from the bearer network by using a mirror port, an optical splitter, or another method. This does not affect the video player in obtaining and playing the target video. In this way, applicability and user experience of the video playback quality detection method can be improved.

After the video playback quality detection apparatus obtains the first video data packet of the target video from the bearer network, the video playback quality detection apparatus may obtain the data byte quantity of the first video data included in the first video data packet. Then, the video playback quality detection apparatus may determine, based on the data byte quantity of the first video data, the buffer byte quantity stored in the video quality detection buffer. The buffer byte quantity indicates a data byte quantity of video data that has been downloaded from the bearer network to the video playback quality detection apparatus by the video playback quality detection apparatus and that is not reduced by simulating video playback performed by the video player.

In embodiments of a specific implementation, after obtaining the first video data packet of the target video, the video playback quality detection apparatus may deeply parse the first video data packet to determine the data byte quantity of the first video data and video attribute information of the target video related to the first video data packet. For example, the video playback quality detection apparatus may analyze the captured first video data packet with reference to a network protocol between the video resource server and the video player. After determining a byte range occupied by the first video data in the first video data packet and the video attribute information of the target video, the video playback quality detection apparatus may parse packet data in the byte range to determine the video attribute information of the target video and a data byte quantity corresponding to the first video data. Herein, the plurality of video data packets corresponding to the target video carry same video attribute information. When obtaining the data byte quantity corresponding to the first video data (it is assumed that a current moment is T1), the video playback quality detection apparatus may determine, as a byte quantity update value, a sum of the foregoing data byte quantity and the buffer byte quantity stored in the video quality detection buffer at the moment T1, and update the buffer byte quantity stored in the video quality detection buffer to the byte quantity update value.

Optionally, after updating the buffer byte quantity stored in the video quality detection buffer, the video playback quality detection apparatus may determine whether the updated buffer byte quantity stored in the video quality detection buffer is greater than or equal to a preset buffer upper limit. If the video playback quality detection apparatus determines that the updated buffer byte quantity stored in the video quality detection buffer is greater than or equal to the preset buffer upper limit, the video playback quality detection apparatus may stop obtaining a new video data packet, re-obtain a new video data packet when the buffer byte quantity stored in the video quality detection buffer is less than or equal to the buffer upper limit, and update, again based on a data byte quantity corresponding to the new data packet, the buffer byte quantity stored in the video quality detection buffer. It should be noted herein that, when the buffer byte quantity stored in the video quality detection buffer is less than the buffer upper limit, each time the video playback quality detection apparatus obtains a new video data packet, the video playback quality detection apparatus updates, based on a data byte quantity corresponding to the new video data packet, the buffer byte quantity stored in the video quality detection buffer until the video player receives the complete target video or the buffer byte quantity stored in the video quality detection buffer reaches the buffer upper limit.

In this embodiment of the present invention, the buffer byte quantity stored in the video quality detection buffer is increased based on the data byte quantity corresponding to the video data packet obtained by the video playback quality detection apparatus, to accurately reflect in real time the increase of a video data buffer amount because the video player downloads the video data from the bearer network.

S102. Obtain video frame data rate information corresponding to the target video, and reduce, based on a video frame rate of the target video and the video frame data rate information of the target video, the buffer byte quantity stored in the video quality detection buffer.

In embodiments of some feasible implementations, the video playback quality detection apparatus may obtain the video frame data rate information corresponding to the target video. Herein, the video frame data rate information of the target video may include single frame data rate information corresponding to each of some or all video frames in the target video. Then, the video playback quality detection apparatus may reduce, based on the video frame data rate information corresponding to the target video and the video frame rate included in the video attribute information, the buffer byte quantity stored in the video quality detection buffer, to obtain the reduced buffer byte quantity stored in the video quality detection buffer.

In embodiments of a specific implementation, the video attribute information that is of the target video and that is obtained through parsing the first video data packet by the video playback quality detection apparatus includes system data of a plurality of basic attributes used to describe the target video. The video attribute information may include a video identifier, a video format, an encoding mode, a value of a video data rate, video duration, a video frame rate, and the like. This is not limited herein. For example, it is assumed that a data format of video attribute information corresponding to a video A is [Xxxx, .avi, H.264, 300 M, 30 min, and 25 fps]. The foregoing video attribute information indicates that a video name corresponding to the video A is Xxxx, a video format is .avi, a video encoding type is H.264, a video data rate is 300 Mb, video duration is 30 min, and a video frame rate is 25 fps. When the buffer byte quantity stored in the video quality detection buffer is greater than or equal to a preset playback buffer threshold (corresponding to a specific scenario in which the video player starts playing only after the video data is buffered for a certain quantity), the video playback quality detection apparatus may obtain the video frame data rate information of the target video.

Optionally, the video playback quality detection apparatus may extract a video identifier of the target video from basic video information (for ease of understanding and description, a target identifier is used as a substitute in the following description). Herein, each of a plurality of videos stored in the video resource server corresponds to only one specific video identifier. In actual application, the video resource server may name any video stored in a video resource library according to a uniform rule. For example, a video identifier of a video may be determined based on three attributes of a video resource: a global resource identifier, a video type, and an encoding mode. For example, a video identifier of a video B may be specifically film.domain.com/mp4/1080P/10001. The video identifier is determined for any video in the video resource library according to the uniform rule. In this way, the video identifier uniquely corresponds to the video. The following case is avoided: An error occurs in matching a video identifier and a video. Therefore, accuracy of searching for subsequent target decoded video information.

After obtaining the target identifier corresponding to the target video, the video playback quality detection apparatus may generate a query request and send the query request to a data rate information cloud server. The query request includes at least the video identifier of the target video. A cloud processor of the data rate information cloud server searches, based on the target identifier in the query request, a cloud memory included in the data rate information cloud server for target decoded video information matching the target video. Herein, the cloud memory includes one or more groups of decoded video information.

Figure 3:
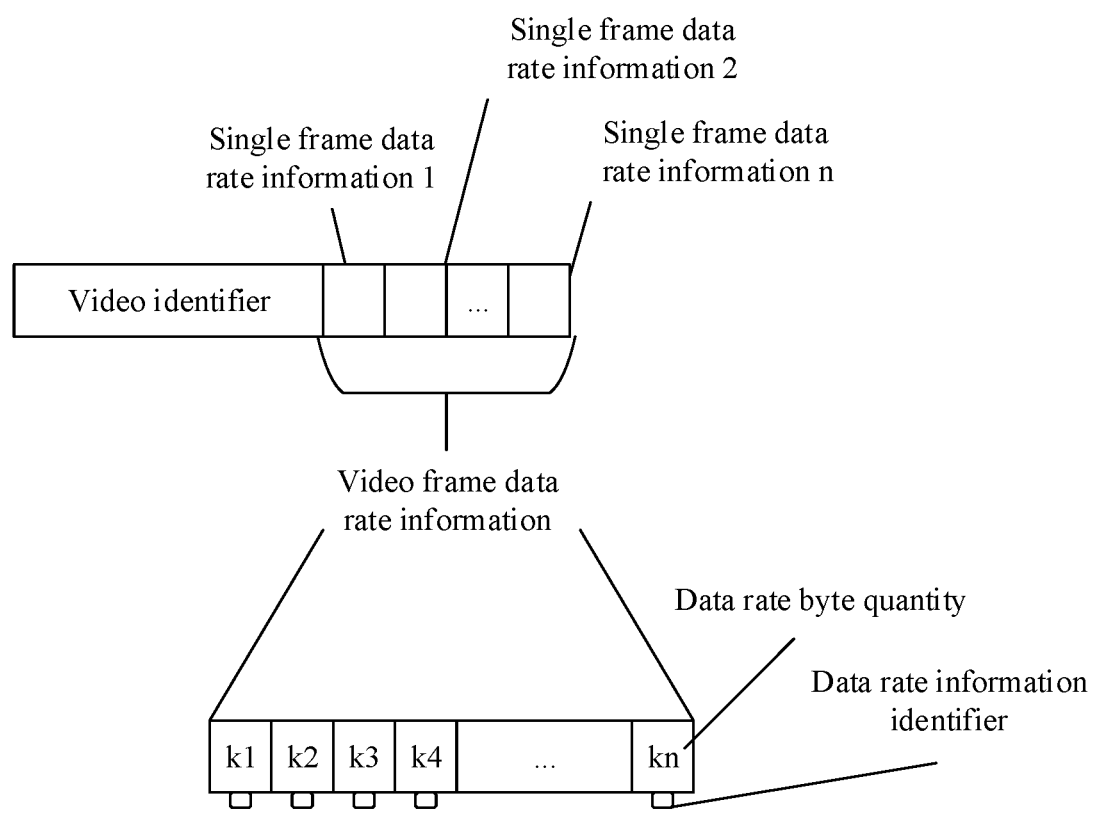
FIG. 3 is a schematic composition diagram of decoded video information according to an embodiment of the present invention.

FIG. 3 is a schematic composition diagram of decoded video information according to an embodiment of the present invention. It may be learned from the diagram that one group of decoded information includes at least a video identifier and video frame data rate information of one video. In embodiments of specific implementation, if the cloud processor of the data rate information cloud server finds, based on the target identifier, that the video identifier included in one group of decoded video information in the cloud memory matches the target identifier of the target video, one group of decoded video information may be determined as the target decoded video information corresponding to the target video, and be sent to the video playback quality detection apparatus. Then, the video playback quality detection apparatus may extract video frame data rate information included in the target decoded video information, and determine the video frame data rate information as the video frame data rate information corresponding to the target video. Referring to FIG. 3, it may be learned from FIG. 3 that the video frame data rate information includes single frame data rate information corresponding to each of some or all video frames in the target video, for example, single frame data rate information 1 to single frame data rate information n shown in the figure. The single frame data rate information corresponding to any video frame includes at least a data rate byte quantity and a data rate information identifier that correspond to any video frame, for example, a data rate byte quantity k1 to a data rate byte quantity kn and a data rate information identifier corresponding to each data rate byte quantity in the figure. The video frame data rate information of the target video is obtained from the data rate information cloud server based on the video identifier of the target video. This method is simple and easy to implement. A data processing amount in the video playback quality detection method can be reduced, and efficiency of the video playback quality detection method can be improved.

Optionally, if the video playback quality detection apparatus determines that none group of decoded video information in the data rate information cloud server can match the target identifier of the target video, the data rate information cloud server may send a query failure notification to the video playback quality detection apparatus. After obtaining the query failure notification, the video playback quality detection apparatus may obtain the video frame data rate information corresponding to the target video from a data rate information buffer. Herein, the video frame data rate information is determined based on some or all decoded video frames corresponding to the target video and stored in the data rate information buffer, and the some or all decoded video frames corresponding to the target video are obtained by decoding video data included in some or all video data packets corresponding to the target video.

In embodiments of some feasible implementations, if the video playback quality detection apparatus obtains the query failure notification, the video playback quality detection apparatus may further extract second video data from a second video data packet that is of the target video and that is obtained by the video playback quality detection apparatus. Herein, the second video data packet corresponding to the target video may represent any one of the plurality of video data packets corresponding to the target video, including the first video data packet. Then, the video playback quality detection apparatus may extract a video encoding type corresponding to the second video data packet from the video attribute information, and determine, based on the video encoding type, a target decoding mode corresponding to the second video data. The video encoding type may be a format such as Mpeg, mpg, dat, or MP4. This is not limited herein. Then, the video playback quality detection apparatus may invoke a corresponding target decoder to perform a decoding operation on the second video data based on the target decoding mode, to obtain a plurality of decoded video frames corresponding to the decoded second video data. Optionally, if the video playback quality detection apparatus is related to a decoder library, and the decoder library includes a plurality of decoders, the video playback quality detection apparatus may determine, based on the video encoding type, M available decoders in the decoder library related to the video playback quality detection apparatus. Then, the video playback quality detection apparatus may compare load amounts of the M available decoders, and select an available decoder with a minimum load amount as a target decoder. The decoder with a minimum load amount is selected to perform a decoding operation, to improve a decoding rate, thereby improving efficiency of the video playback quality detection method.

After obtaining the decoded second video data, the video playback quality detection apparatus may determine, based on the decoded second video data, single frame data rate information of a plurality of video frames corresponding to the second video data packet. The decoded second video data includes a plurality of decoded video frames. The following uses any decoded video frame i in the plurality of decoded video frames as an example. The video playback quality detection apparatus may obtain a picture data rate byte quantity (assuming S kb) and an audio data rate byte quantity (assuming T kb) that correspond to the decoded video frame i, and then determine that a single frame data rate byte quantity corresponding to the decoded video frame i is (S+T) kb. The video playback quality detection apparatus may further obtain a frame identifier corresponding to the decoded video frame i, determine, based on the frame identifier, a data rate information identifier corresponding to the decoded video frame i, and then determine, based on the single frame data rate byte quantity and the data rate information identifier that correspond to the decoded video frame i, single frame data rate information corresponding to the decoded video frame i. Herein, one frame identifier uniquely corresponds to one data rate information identifier. In a video, the frame identifier is used to distinguish between video frames included in the video, and may correspond to a sequence relationship of each video frame in the video. Therefore, correspondingly, the data rate information identifier determined based on the frame identifier may also represent a location relationship of single frame data rate information. For example, it is assumed that a frame identifier 2 corresponds to a $10^{th}$ video frame in the video, and a frame identifier 1 corresponds to a $9^{th}$ video frame in the video. In this case, single frame data rate information corresponding to a data rate information identifier determined based on the frame identifier 2 may be a $10^{th}$ piece of single frame data rate information in the video frame data rate information, and single frame data rate information corresponding to a data rate information identifier determined based on the frame identifier 1 may be a $9^{th}$ piece of single frame data rate information in the video frame data rate information. The video playback quality detection apparatus may determine, by repeating the foregoing operations, a plurality of pieces of single frame data rate information corresponding to the second video data packet.

Then, the video playback quality detection apparatus may store, in the data rate information buffer, a plurality of single frame data rate byte quantities corresponding to the second video data packet, to update the video frame data rate information that is of the target video and that is stored in the data rate information buffer. It may be understood herein that the video playback quality detection apparatus needs some time to complete updating the video frame data rate information that is of the target video and that is stored in the data rate information buffer. Therefore, before the update is completed, the video frame data rate information stored in the data rate information buffer is single frame data rate information corresponding to each of some video frames in the target video. After the update is completed, the video frame data rate information stored in the data rate information buffer may be single frame data rate information corresponding to each of all video frames in the target video.

Optionally, the video playback quality detection apparatus may further send, to the data rate information cloud server, the video frame data rate information that is of the target video and that is stored in the data rate information buffer. The data rate information cloud server obtains and stores the video frame data rate information corresponding to the target video. In embodiments of a specific implementation, the video playback quality detection apparatus may send, to the data rate information cloud server, the video frame data rate information that is of the target video and that is stored in the data rate information buffer, and the data rate information cloud server may determine a group of first decoded video information related to the target video. For composition of the first decoded video information, refer to FIG. 3. Details are not described herein. Then, the data rate information cloud server may store, in the first decoded video information, the obtained video frame data rate information stored in the data rate information buffer. The video frame data rate information corresponding to the target video is stored in the data rate information cloud server, to update video frame data rate data stored in the data rate information cloud server. In this way, the video frame data rate information of the target video can be directly obtained from the data rate information cloud server in a next time of performing video playback quality detection on the target video. Based on the foregoing operations, efficiency of the video playback quality detection method can be improved.

In embodiments of some feasible implementations, after obtaining the video frame data rate information of the target video, the video playback quality detection apparatus may reduce, based on the video frame rate of the target video and the video frame data rate information of the target video, the buffer byte quantity stored in the video quality detection buffer, so that the reduced buffer byte quantity stored in the video quality detection buffer can accurately reflect in real time an actual buffer amount of video data in a process of playing the target video on the video player.

In embodiments of a specific implementation, if the video playback quality detection apparatus reduces, for a first time, the buffer byte quantity stored in the video quality detection buffer, at the expiration of a first reduction cycle determined based on the video frame rate, the video playback quality detection apparatus may determine a first video frame corresponding to a start moment of the target video, and determine, from the video frame data rate information of the target video, first single frame data rate information corresponding to the first video frame. Then, the video playback quality detection apparatus may obtain a first data rate byte quantity included in the first single frame data rate information, and reduce the buffer byte quantity stored in the video quality detection buffer by a value corresponding to the first data rate byte quantity, to obtain the reduced buffer byte quantity stored in the video quality detection buffer. Optionally, if the video playback quality detection apparatus detects the expiration of a second reduction cycle after the first reduction cycle, at the expiration of the first reduction cycle, the video playback quality detection apparatus may obtain the first single frame data rate information corresponding to a reduced value of the buffer byte quantity stored in the video quality detection buffer. Then, the video playback quality detection apparatus determines a second data rate information identifier based on a first data rate information identifier included in the first single frame data rate information, and determines, based on the second data rate information identifier, second single frame data rate information from the video frame data rate information corresponding to the target video. Finally, the video playback quality detection apparatus may obtain a second data rate byte quantity included in the second single frame data rate information, and reduce the buffer byte quantity stored in the video quality detection buffer by a value corresponding to the second data rate byte quantity, to obtain the reduced buffer byte quantity stored in the video quality detection buffer. Likewise, at the expiration of any reduction cycle i after the second reduction cycle, a single frame data rate byte quantity corresponding to the reduction cycle i may be obtained by using the same process above.

It should be noted that the first reduction cycle and the second reduction cycle have a same size, and the first reduction cycle and the second reduction cycle are only used to distinguish between reduction cycles at different moments. For example, it is assumed that the video frame rate of the target video is 25 fps, that is, 25 target video frames can be played in one second. In this case, a reduction cycle determined based on the video frame rate is 40 ms. Optionally, if the video playback quality detection apparatus detects the expiration of the second reduction cycle (that is, 40 ms), at the expiration of the first reduction cycle before the second reduction cycle, the video playback quality detection apparatus may obtain the first single frame data rate information corresponding to a reduced value of the buffer byte quantity stored in the video quality detection buffer. Then, the video playback quality detection apparatus may determine the second single frame data rate information based on the first data rate information identifier in the first single frame data rate information. For example, if the obtained first data rate information identifier is 19, it indicates that the first single frame data rate information is a $19^{th}$ piece of single frame data rate information in the video frame data rate information corresponding to the target video. In this case, the second data rate information identifier is 20. Then, the video playback quality detection apparatus may determine the second single frame data rate information based on a $20^{th}$ piece of single frame data rate information related to the second data rate information identifier: 20. Then, the video playback quality detection apparatus obtains the second data rate byte quantity included in the second single frame data rate information, and reduces the buffer byte quantity stored in the video quality detection buffer by a value corresponding to the second data rate byte quantity.

Optionally, the video playback quality detection apparatus may further use a preset time interval T as a preset cycle to perform a reduction operation on the buffer byte quantity stored in the video quality detection buffer. Herein, T is an integer multiple of the reduction cycle. For example, when the video playback quality detection apparatus determines the expiration of a preset cycle of 5 s, 125 single frame data rate byte quantities may be subtracted from the buffer byte quantity stored in the video quality detection buffer, to obtain the reduced buffer byte quantity. Likewise, for a process of determining each of 125 single frame data rate byte quantities herein, refer to the foregoing process of determining the to-be-reduced single frame data rate byte quantity at the expiration of the second reduction cycle based on the reduced single frame data rate byte quantity reduced at the expiration of the first reduction cycle.

In this embodiment of the present invention, the buffer byte quantity stored in a video quality detection buffer is reduced based on the video frame data rate information of the target video, to accurately simulate in real time a reduced data amount in a process of playing a video data buffer amount on the video player. In this way, a playback status that is of the target video and that is subsequently determined based on the reduced buffer byte quantity stored in the video quality detection buffer is true and effective, thereby improving accuracy of the video playback quality detection method.

S103. Determine, based on the reduced buffer byte quantity stored in the video quality detection buffer, the playback status of playing the target video on the video player.

In embodiments of some feasible implementations, the video playback quality detection apparatus reduces, based on the video frame data rate information of the target video and the video frame rate of the target video, the buffer byte quantity stored in the video quality detection buffer, so that the reduced buffer byte quantity stored in the video quality detection buffer can accurately reflect in real time an actual buffer amount of video data in a process of playing the target video on the video player. Therefore, the video playback quality detection apparatus can determine, based on the reduced buffer byte quantity stored in the video quality detection buffer, the playback status of playing the target video on the video player.

Optionally, after the video playback quality detection apparatus obtains the reduced buffer byte quantity stored in the video quality detection buffer, if the video playback quality detection apparatus determines that the reduced buffer byte quantity is less than or equal to a preset stalling byte quantity threshold, it may be determined that the playback status of the target video is a stalling state. Herein, it may be learned from a video playback mechanism of the video player that if a video data buffer amount in the video player is less than a specific threshold, it indicates insufficient playback resources, and the video player stops playing the video. Therefore, when the video playback quality detection apparatus determines that the reduced buffer byte quantity is less than or equal to the preset stalling byte quantity threshold, it may be determined that the target video is in the stalling state. The stalling byte quantity threshold may be determined based on a type of the video player. Different stalling byte quantity thresholds may be determined based on different types of video players. This is not limited herein.

In this embodiment of the present invention, the reduced buffer byte quantity stored in the video quality detection buffer may accurately reflect in real time an actual buffer amount of video data when the video player plays the target video. Therefore, the playback status that is of playing the target video on the video player and that is determined based on the reduced buffer byte quantity stored in the video quality detection buffer is true, effective, and highly accurate.

S104. Determine video playback quality of the target video based on the playback status.

In embodiments of some feasible implementations, after determining the playback status of playing the target video on the video player, the video playback quality detection apparatus may determine the video playback quality of the target video based on the playback status. In embodiments of a specific implementation, when the video playback quality detection apparatus determines that the playback status of playing the target video on the video player is the stalling state, the video playback quality detection apparatus may determine a quantity of stalling times that corresponds to the target video. For example, the video playback quality detection apparatus may record a time at which the target video is in the stalling state, and count a total quantity of stalling times of the target video from a start time of playing the video to a current moment. Then, the video playback quality detection apparatus may determine whether the quantity of stalling times of the target video is greater than or equal to a first preset quantity threshold. If the video playback quality detection apparatus determines that the quantity of stalling times that corresponds to the target video is greater than or equal to a first preset quantity threshold, the video playback quality detection apparatus may determine that the video playback quality of playing the target video on the video player is poor. Otherwise, the video playback quality detection apparatus may determine that the playback quality of playing the target video on the video player is good. Optionally, the video playback quality detection apparatus may further determine whether the quantity of stalling times of the target video is greater than or equal to a second preset quantity threshold at the expiration of a preset detection period. If the video playback quality detection apparatus determines that the quantity of stalling times of the target video is greater than or equal to the second preset quantity threshold at the expiration of the preset detection period, the video playback quality detection apparatus may determine that the playback quality of playing the target video on the video player is poor. Otherwise, the video playback quality detection apparatus may determine that playback quality of playing the target video on the video player is good. The video playback quality of the target video is determined based on the quantity of stalling times that corresponds to the target video. This method is simple and easy to implement. In this way, efficiency and applicability of the video playback quality detection method can be improved.

In embodiments of some feasible implementations, when the video playback quality detection apparatus determines that the playback status of the target video is the stalling state, the video playback quality detection apparatus may stop performing the step of reducing, based on the video frame rate of the target video and the video frame data rate information of the target video, the buffer byte quantity stored in the video quality detection buffer. In this case, the video playback quality detection apparatus may continue to obtain a new video data packet, and increase, based on a data byte quantity of video data in the new video data packet, the buffer byte quantity stored in the video quality detection buffer. In this way, a video data buffer mechanism used when the video player is in the stalling state may be synchronously simulated. When the buffer byte quantity stored in the video quality detection buffer is greater than or equal to a preset fluent byte quantity threshold, the video playback quality detection apparatus may determine that the playback status of the target video on a video player is switched from the stalling state to a fluent state. In this case, the video playback quality detection apparatus may continue to perform the step of reducing, based on the video frame rate and the video frame data rate information, the buffer byte quantity stored in the video quality detection buffer. Then, the video playback quality detection apparatus may obtain duration in which the playback status of the target video is switched from the stalling state to the fluent state, and update the total stalling duration of the target video based on the duration.

After the video playback quality detection apparatus obtains the total stalling duration of the target video, if it is determined that the total stalling duration of the target video is greater than or equal to a preset stalling duration threshold, the video playback quality detection apparatus may determine that the video playback quality of the target video is poor. Optionally, the video playback quality detection apparatus may alternatively determine at the expiration of a preset detection period whether the total stalling duration of the target video is greater than or equal to second preset duration. If the video playback quality detection apparatus determines that the total stalling duration of the target video is greater than or equal to the second preset duration, the video playback quality detection apparatus may determine that the video playback quality of the target video is poor. The video playback status of the target video is determined based on the total stalling duration of the target video. In this way, misjudgment caused by a small quantity of stalling times but excessive total stalling duration can be avoided, thereby improving accuracy of the video playback quality detection method.

Optionally, after obtaining the reduced buffer byte quantity stored in the video quality detection buffer, the video playback quality detection apparatus may determine, based on the reduced buffer byte quantity, a playback time of playing the target video on the video player. For example, when the buffer byte quantity is greater than a preset playback threshold, it may be determined that the video player starts to play the target video. Whether the video player starts to play the target video is determined in real time based on a value of the buffer byte quantity. In this way, the video playback quality detection apparatus can fully determine the playback status of playing the target video on the video player, and the video playback quality detection apparatus can effectively assist the video player in providing better user experience in viewing a video.

In this embodiment of the present invention, the buffer byte quantity stored in the video quality detection buffer is adjusted in real time based on data byte data corresponding to the video data packet of the target video and the video frame data rate information of the target video, so that the buffer byte quantity stored in the video quality detection buffer can accurately reflect in real time an actual buffer amount of video data in a process of playing the target video on the video player. Therefore, the playback quality of playing the target video on the video player can be accurately detected based on the buffer byte quantity stored in the video quality detection buffer. Based on the foregoing operations, real-time quality and accuracy of the video quality detection method can be improved, and user experience of the video quality detection method can be improved.

Embodiment 2

Figure 4:
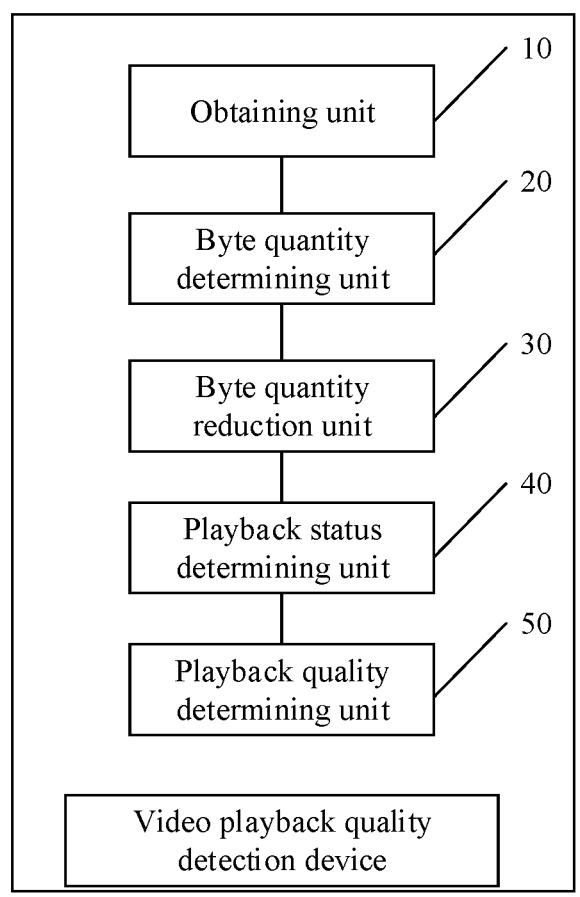
FIG. 4 is a schematic structural diagram of a video playback quality detection apparatus according to an embodiment of the present invention.

FIG. 4 is a schematic structural diagram of a video playback quality detection apparatus according to an embodiment of the present invention. The video playback quality detection apparatus includes an obtaining unit 10, a byte quantity determining unit 20, a byte quantity reduction unit 30, a playback status determining unit 40, and a playback quality determining unit 50.

The obtaining unit 10 is configured to obtain a first video data packet of a target video from a bearer network.

The byte quantity determining unit 20 is configured to: when the obtaining unit 10 obtains the first video data packet of the target video from the bearer network, obtain a data byte quantity of first video data in the first video data packet, and determine, based on the data byte quantity, a buffer byte quantity stored in a video quality detection buffer. The bearer network is a network that is between a video resource server and a video player and that is used to transmit the target video. The target video corresponds to a plurality of video data packets including the first video data packet.

The byte quantity reduction unit 30 is configured to: when video frame data rate information corresponding to the target video is obtained, reduce, based on a video frame rate of the target video and the video frame data rate information of the target video, the buffer byte quantity stored in the video quality detection buffer. Herein, the video frame data rate information includes single frame data rate information corresponding to each of some or all video frames in the target video. The single frame data rate information corresponding to any video frame includes at least a data rate byte quantity and a data rate information identifier that correspond to any video frame.

The playback status determining unit 40 is configured to determine, based on the buffer byte quantity that is reduced by the byte quantity reduction unit 30 and that is stored in the video quality detection buffer, a playback status of playing the target video on the video player.

The playback quality determining unit 50 is configured to determine video playback quality of the target video based on the playback status determined by the playback status determining unit.

In embodiments of some feasible implementations, the byte quantity reduction unit 30 is configured to:

obtain video attribute information of the target video, and determine a video identifier of the target video based on the video attribute information; and if target decoded video information is obtained from a data rate information cloud server through matching based on the video identifier, determine, based on the target decoded video information, the video frame data rate information corresponding to the target video, where the data rate information cloud server includes one or more groups of decoded video information, and one group of decoded information includes at least a video identifier and video frame data rate information of one video.

In embodiments of some feasible implementations, the video playback quality detection apparatus includes a data rate information buffer. The byte quantity reduction unit 30 is further configured to:

obtain, from the data rate information buffer, the video frame data rate information corresponding to the target video, where the video frame data rate information is determined based on some or all decoded video frames corresponding to the target video and is stored in the data rate information buffer, and the some or all decoded video frames corresponding to the target video are obtained by decoding video data included in some or all video data packets corresponding to the target video.

In embodiments of some feasible implementations, the video attribute information includes a video encoding type and a video frame rate, and the byte quantity reduction unit 30 is further configured to:

obtain second video data included in a second video data packet corresponding to the target video; decode the second video data based on the video encoding type, and determine, based on the decoded second video data, single frame data rate information of a plurality of video frames corresponding to the second video data packet; and store, in the data rate information buffer, the single frame data rate information of the plurality of video frames corresponding to the second video data packet, to update the video frame data rate information that is of the target video and that is stored in the data rate information buffer.

In embodiments of some feasible implementations, the decoded second video data includes a plurality of decoded video frames. The byte quantity reduction unit 30 is further configured to:

perform the following operations on any decoded video frame i in the plurality of decoded video frames:

obtaining a picture data rate byte quantity and an audio data rate byte quantity that correspond to the decoded video frame i; combining the picture data rate byte quantity and the audio data rate byte quantity into a single frame data rate byte quantity corresponding to the decoded video frame i; and obtaining a frame identifier corresponding to the decoded video frame i, and determining a data rate information identifier corresponding to the decoded video frame i based on the frame identifier corresponding to the decoded video frame i; and determine the single frame data rate information of the plurality of video frames corresponding to the video data packet based on each single frame data rate byte quantity corresponding to each of the plurality of decoded video frames and each data rate information identifier corresponding to each decoded video frame.

In embodiments of some feasible implementations, the byte quantity reduction unit 30 is further configured to:

transmit, to the data rate information cloud server, the video frame data rate information that is of the target video and that is stored in the data rate information buffer, to store, in the data rate information cloud server, the video frame data rate information corresponding to the target video.

In embodiments of some feasible implementations, the byte quantity reduction unit 30 is further configured to:

at the expiration of a first reduction cycle determined based on the video frame rate, determine a first video frame that is of the target video and that corresponds to a start moment of the target video, and determine, based on the video frame data rate information of the target video, first single frame data rate information corresponding to the first video frame; and obtain a first data rate byte quantity included in the first single frame data rate information, and reduce the buffer byte quantity stored in the video quality detection buffer by a value corresponding to the first data rate byte quantity, to obtain the reduced buffer byte quantity stored in the video quality detection buffer.

In embodiments of some feasible implementations, the byte quantity reduction unit 30 is further configured to:

at the expiration of a second reduction cycle after the first reduction cycle, determine a second data rate information identifier based on a first data rate information identifier included in the first single frame data rate information, and determine, based on the second data rate information identifier, second single frame data rate information from the video frame data rate information corresponding to the target video; and obtain a second data rate byte quantity included in the second single frame data rate information, and reduce the buffer byte quantity stored in the video quality detection buffer by a value corresponding to the second data rate byte quantity, to obtain the reduced buffer byte quantity stored in the video quality detection buffer.

In embodiments of some feasible implementations, the playback status includes a stalling state, and the playback status determining unit 40 is configured to:

if the buffer byte quantity that is reduced by the byte quantity reduction unit 30 and that is stored in the video quality detection buffer is less than or equal to a stalling byte quantity threshold, determine that the playback status of the target video is the stalling state.

In some feasible implementations, the playback quality determining unit 50 is configured to:

when the playback status determining unit 40 determines that the playback status of the target video is the stalling state, determine a quantity of stalling times that corresponds to the target video; and if the quantity of stalling times that corresponds to the target video is greater than or equal to a first preset quantity threshold, or when the quantity of stalling times that corresponds to the target video is greater than or equal to a second preset quantity threshold at the expiration of a preset detection period, determine that the video playback quality of the target video is poor.

Figure 5:
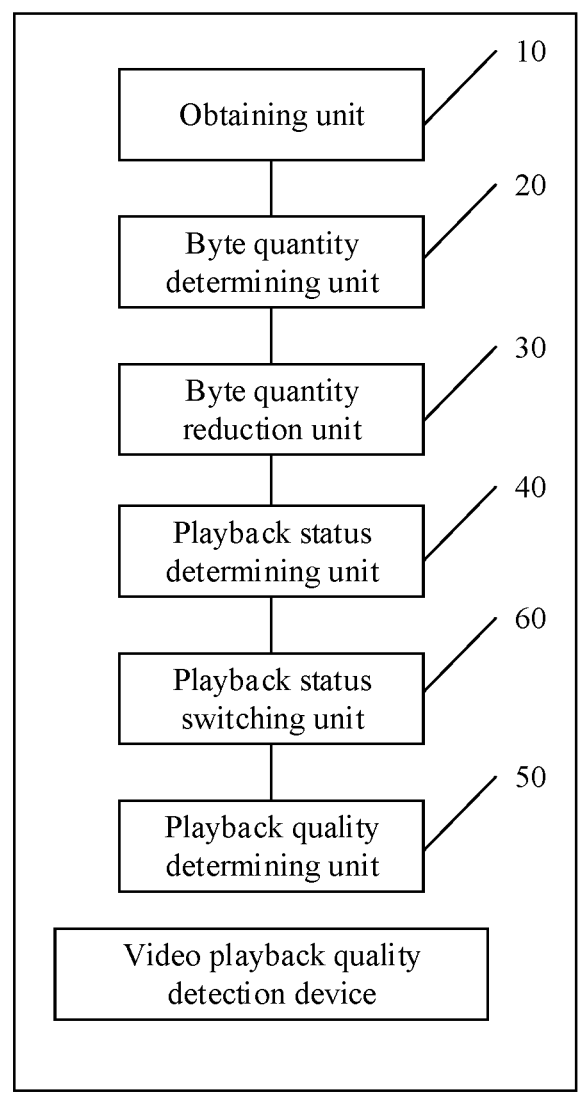
FIG. 5 is another schematic structural diagram of a video playback quality detection apparatus according to an embodiment of the present invention.

In embodiments of some feasible implementations, FIG. 5 is another schematic structural diagram of a video playback quality detection apparatus according to an embodiment of the present invention. The video playback quality detection apparatus further includes a playback status switching unit 60.

The playback status switching unit 60 is configured to: trigger the byte quantity reduction unit 30 to stop performing the step of reducing, based on the video frame rate of the target video and the video frame data rate information of the target video, the buffer byte quantity stored in the video quality detection buffer; and when the buffer byte quantity stored in the video quality detection buffer is greater than or equal to a preset fluent byte quantity threshold, determine to switch the playback status of the target video from the stalling state to a fluent state, and trigger the byte quantity reduction unit 30 to continue the step of reducing, based on the video frame rate of the target video and the video frame data rate information of the target video, the buffer byte quantity stored in the video quality detection buffer; and update total stalling duration of the target video based on duration of switching the playback status of the target video from the stalling state to the fluent state.

The playback quality determining unit 50 is configured to: if the total stalling duration that is of the target video and that is determined by the playback status switching unit 60 is greater than or equal to first preset stalling duration, or if the total stalling duration of the target video is greater than or equal to second preset stalling duration at the expiration of a preset detection period, determine that playback quality of the target video is poor.

In embodiments of some feasible implementations, the obtaining unit 10 may monitor in real time whether the video player sends, to the video resource server, a video playback request used to obtain the target video. The target video is a to-be-detected video. If the obtaining unit 10 finds the video playback request through monitoring, the obtaining unit 10 may obtain the first video data packet of the target video from the bearer network when the video resource server sends the target video to the video player. The target video may correspond to the plurality of video data packets. The first video data packet may represent any one of the plurality of video data packets. Optionally, the obtaining unit 10 may obtain the first video data packet of the target video from the bearer network in a port mirroring manner. For example, the obtaining unit 10 may set a mirror port on an output port at a core layer device of the bearer network, and copy and obtain, by using the mirror port, the first video data packet of the target video transmitted by using the bearer network. Optionally, the obtaining unit 10 may alternatively obtain the first video data packet of the target video from the bearer network by using an optical splitter.

When the obtaining unit 10 obtains the first video data packet of the target video from the bearer network, the byte quantity determining unit 20 may obtain a data byte quantity of first video data included in the first video data packet. Then, the byte quantity determining unit 20 may determine, based on the data byte quantity of the first video data, the buffer byte quantity stored in the video quality detection buffer. The buffer byte quantity indicates a data byte quantity of video data that has been downloaded from the bearer network to the obtaining unit 10 by the obtaining unit 10 and that is not reduced by simulating video playback performed by the video player. The byte quantity determining unit 20 determines, based on the data byte quantity of the first video data, the buffer byte quantity stored in the video quality detection buffer. For this process, refer to the process that is of determining the buffer byte quantity stored in the video quality detection buffer and that is described in step S101 in the embodiment. Details are not described herein again.

In embodiments of some feasible implementations, the byte quantity reduction unit 30 may obtain the video frame data rate information corresponding to the target video. Herein, the video frame data rate information of the target video may include single frame data rate information corresponding to each of some or all video frames in the target video. Then, the byte quantity reduction unit 30 may reduce, based on the video frame data rate information corresponding to the target video and the video frame rate included in the video attribute information obtained by the byte quantity reduction unit 30, the buffer byte quantity stored in the video quality detection buffer, to obtain the reduced buffer byte quantity stored in the video quality detection buffer. The byte quantity reduction unit 30 reduces, based on the video frame data rate information corresponding to the target video and the video frame rate of the target video, the buffer byte quantity stored in the video quality detection buffer. For this process, refer to the process that is of reducing, based on the video frame data rate information corresponding to the target video and the video frame rate, the buffer byte quantity stored in the video quality detection buffer and that is described in step S102 in Embodiment 1. Details are not described herein again.

The playback status determining unit 40 may determine, based on the buffer byte quantity that is reduced by the byte quantity reduction unit 30 and that is stored in the video quality detection buffer, the playback status of playing the target video on the video player. The playback status determining unit 40 determines the playback status of playing the target video on the video player. For this process, refer to the process that is of determining, based on the reduced buffer byte quantity stored in the video quality detection buffer, the playback status of playing the target video on the video player and that is described in step S103 in Embodiment 1. Details are not described herein again.

When the playback status determining unit 40 determines that the playback status of the target video is the stalling state, the playback quality determining unit 50 may determine the quantity of stalling times that corresponds to the target video. Then, the playback quality determining unit 50 may determine video playback quality of the target video based on the quantity of stalling times that corresponds to the target video. For embodiments of a specific process, refer to the process that is described in step S104 in Embodiment 1 and that is of determining the video playback quality of the target video based on the quantity of stalling times that corresponds to the target video. Details are not described herein again.

Optionally, when the playback status determining unit 40 determines that the playback status of the target video is the stalling state, the playback status switching unit 60 may trigger the byte quantity reduction unit 30 to stop performing the step of reducing, based on the video frame rate of the target video and the video frame data rate information of the target video, the buffer byte quantity stored in the video quality detection buffer. A video data buffer mechanism used when the video player is in the stalling state is synchronously simulated. In this case, the obtaining unit 10 may continue to obtain a new video data packet, and the byte quantity determining unit 20 may increase, based on a data byte quantity of video data in the new video data packet, the buffer byte quantity stored in the video quality detection buffer. When the buffer byte quantity stored in the video quality detection buffer is greater than or equal to the preset fluent byte quantity threshold, the playback status switching unit 60 may determine that the playback status of the target video on a video player is switched from the stalling state to the fluent state. The playback status switching unit 60 may trigger the byte quantity reduction unit 30 to continue performing the step of reducing, based on the video frame rate of the target video and the video frame data rate information of the target video, the buffer byte quantity stored in the video quality detection buffer. In addition, the playback quality determining unit 50 may record duration in which the playback status of the target video is switched from the stalling state to the fluent state, and update the total stalling duration of the target video based on the duration. The playback quality determining unit 50 may determine the video playback quality of the target video based on the total stalling duration of the target video after obtaining the total stalling duration of the target video. For embodiments of a specific process, refer to the process that is described in step S104 in Embodiment 1 and that is of determining the video playback quality of the target video based on the total stalling duration of the target video. Details are not described herein again.

Optionally, the playback status determining unit 40 may further determine a playback time of the target video on the video player based on the buffer byte quantity. For embodiments of a specific process, refer to the process of determining described in step S104 in Embodiment 1. Details are not described herein again.

In this embodiment of the present invention, the buffer byte quantity stored in the video quality detection buffer is adjusted in real time based on data byte data corresponding to the video data packet of the target video and the video frame data rate information of the target video, so that the buffer byte quantity stored in the video quality detection buffer can accurately reflect in real time an actual buffer amount of video data in a process of playing the target video on the video player. Therefore, the playback quality of playing the target video on the video player can be accurately detected based on the buffer byte quantity stored in the video quality detection buffer. Based on the foregoing operations, real-time quality and accuracy of the video quality detection method can be improved, and user experience of the video quality detection method can be improved.

Figure 6:
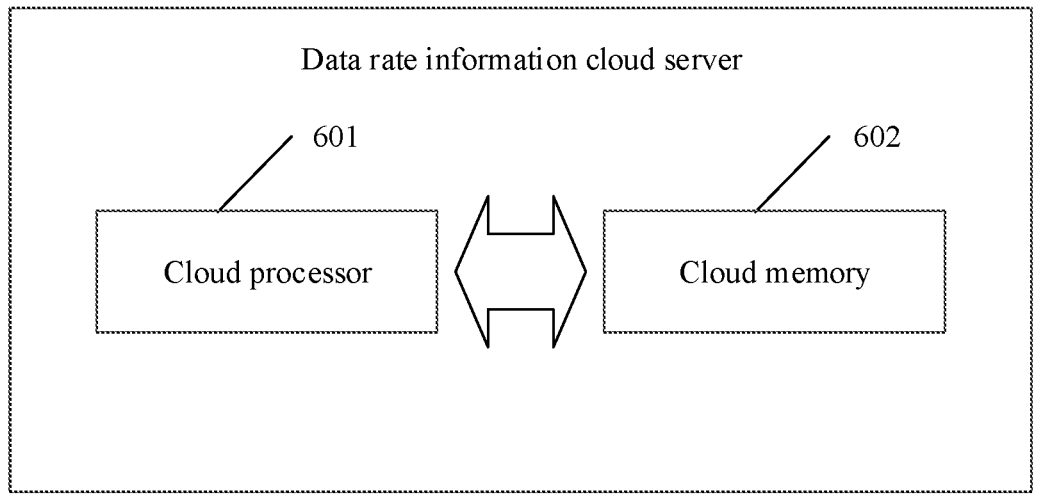
FIG. 6 is a schematic structural diagram of a data rate information cloud service platform according to an embodiment of the present invention.

FIG. 6 is a schematic structural diagram of a data rate information cloud server according to an embodiment of the present invention. The data rate information cloud server includes a cloud processor 601 and a cloud memory 602. The cloud memory 602 stores one or more groups of decoded video information. The one or more groups of decoded information are used to determine a video identifier and video frame data rate information of each of one or more videos including a target video.

In embodiments of some feasible implementations, the cloud processor 601 is configured to: receive a query request sent by a video playback quality detection apparatus, where the query request includes a video identifier of the target video; search the cloud memory 602 for target decoded video information based on the video identifier of the target video; and then, send the target decoded video information to the video playback quality detection apparatus, where the target decoded video information is used to determine video frame data rate information of the target video, the video frame data rate information of the target video is used to determine a reduced buffer byte quantity stored in a video quality detection buffer, and the reduced buffer byte quantity stored in the video quality detection buffer is used to determine video playback quality of the target video.

In embodiments of some feasible implementations, if the target decoded video information cannot be found, the cloud processor 601 is further configured to send a query failure notification to the video playback quality detection apparatus.

In embodiments of some feasible implementations, the cloud processor 601 is further configured to: obtain video data of the target video; decode the video data based on a video encoding type of the target video, and determine, based on the decoded video data, single frame data rate information of a plurality of video frames corresponding to a video data packet; and store, in the cloud memory 602, the single frame data rate information of the plurality of video frames corresponding to the video data packet.

In embodiments of some feasible implementations, the data rate information cloud server is connected to a plurality of video playback quality detection apparatuses. If the target decoded video information cannot be found, the cloud processor 601 is further configured to: obtain a decoding load parameter of each of the plurality of video playback quality detection apparatuses; and determine one or more idle video playback quality detection apparatuses in the plurality of video playback quality detection apparatuses based on the decoding load parameter of each video playback quality detection apparatus. Then, the cloud processor 601 determines a target idle video playback quality detection apparatus from the one or more idle video playback quality detection apparatuses, and determines the video frame data rate information of the target video by using the target idle video playback quality detection apparatus. Herein, a video playback quality detection apparatus with a minimum decoding load is selected from the plurality of video playback quality detection apparatuses connected to the data rate information cloud server to determine the video frame data rate information of the target video, to fully use a video decoding capability of the plurality of video playback quality detection apparatuses, thereby improving efficiency of a video playback quality detection method.

In embodiments of some feasible implementations, the cloud processor 601 is configured to receive and store the video frame data rate information that is of the target video and that is sent by the video playback quality detection apparatus. Herein, the video frame data rate information of the target video is stored in a data rate information buffer in the video playback quality detection apparatus.

Figure 7:
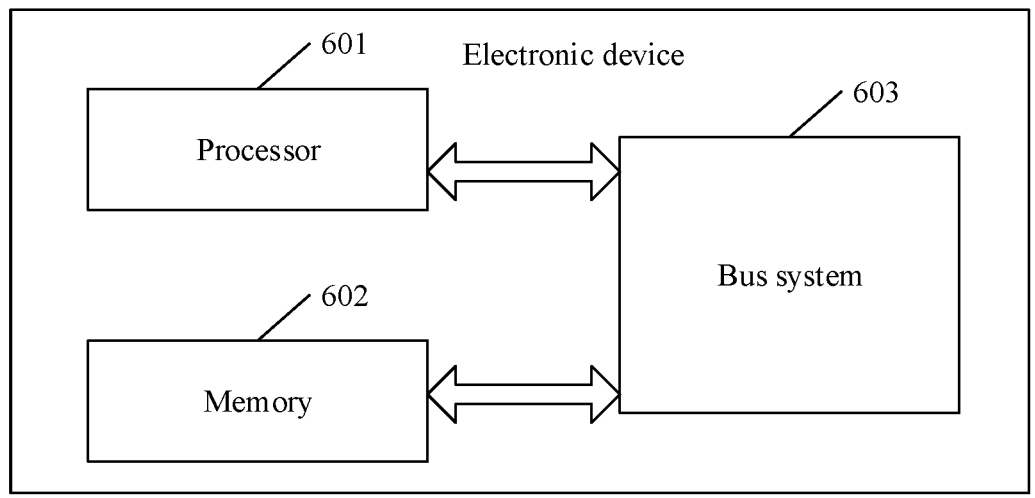
FIG. 7 is a schematic structural diagram of an electronic device according to an embodiment of the present invention.

FIG. 7 is a schematic structural diagram of an electronic device according to an embodiment of the present invention. The electronic device provided in this embodiment of the present invention includes: a processor 701, a memory 702, and a bus system 703. The processor 701 and the memory 702 are connected by using the bus system 703.

The memory 702 is configured to store a program. Specifically, the program may include program code. The program code includes a computer operation instruction. The memory 702 includes but is not limited to a random access memory (random access memory, RAM), a read-only memory (read-only memory, ROM), an erasable programmable read-only memory (erasable programmable read-only memory, EPROM), or a compact disc read-only memory (compact disc read-only memory, CD-ROM). Only one memory is shown in FIG. 7. Certainly, a plurality of memories may be disposed as required.

The memory 702 may be alternatively a memory in the processor 701. This is not limited herein.

In embodiments of some implementations, the memory 702 stores the following elements, an executable module or a data structure, or a subset thereof, or an extended set thereof:

an operation instruction: including various operation instructions and used to implement various operations; and an operating system: including various system programs and used to implement various basic services and process hardware-based tasks.

The processor 701 controls an operation of the electronic device. The processor 701 may be one or more central processing units (central processing unit, CPU). When the processor 701 is one CPU, the CPU may be a single-core CPU, or may be a multi-core CPU.

In embodiments of a specific application, components of the electronic device are coupled together by using the bus system 703. In addition to a data bus, the bus system 703 may further include a power bus, a control bus, and a status signal bus. However, for clear description, various types of buses in FIG. 7 are marked as the bus system 703. For ease of denotation, only illustrative depiction is provided in FIG. 7.

The video playback quality detection method disclosed in the embodiments of the present invention may be applied to the processor 701, or implemented by the processor 701. The processor 701 may be an integrated circuit chip and has a signal processing capability.

An embodiment of the present invention provides a computer-readable storage medium. The computer-readable storage medium stores an instruction. When the instruction is run on a computer, the video playback quality detection method described in Embodiment 1 may be implemented.

The computer-readable storage medium may be an internal storage unit of the video playback quality detection apparatus in any one of the foregoing embodiments, for example, a hard disk or a memory of the video playback quality detection apparatus. The computer-readable storage medium may be alternatively an external storage device of the terminal device, for example, a removable hard disk, a smart media card (SMC), a secure digital (SD) card, a flash card, and the like that are configured on the terminal device. Further, the computer-readable storage medium may include both the internal storage unit and the external storage device of the terminal device. The computer-readable storage medium is configured to store the computer program and other programs and data required by the terminal device. The computer-readable storage medium may be further configured to temporarily store data that has been output or that is to be output.

What is claimed is:

1. A video playback quality detection method, comprising:
    obtaining, by a video playback quality detection apparatus, a first video data packet of a target video from a bearer network, obtaining a data byte quantity of first video data in the first video data packet, and updating a buffer byte quantity stored in a video quality detection buffer based on the data byte quantity, wherein the target video comprises a plurality of video data packets comprising the first video data packet, and the target video is transmitted by a video resource server over a bearer network to a video player and played on the video player, the bearer network is a network between the video resource server and the video player that is used for transmission of the target video, wherein the data byte quantity is a number of data bytes of the first video data included in the first video data packet, and wherein the buffer byte quantity indicates a data byte quantity of video data that has been downloaded from the bearer network to the video playback quality detection apparatus by the video playback quality detection apparatus and that is not reduced by simulating video playback performed by the video player;
    obtaining, by the video playback quality detection apparatus, video frame data rate information corresponding to the target video, and reducing, by the video playback quality detection apparatus based on a video frame rate of the target video and the video frame data rate information of the target video, the buffer byte quantity stored in the video quality detection buffer, wherein the video frame data rate information comprises single frame data rate information corresponding to each of some or all video frames in the target video, and the single frame data rate information corresponding to any video frame comprises at least a data rate byte quantity and a data rate information identifier that correspond to said any video frame;
    determining, by the video playback quality detection apparatus based on the reduced buffer byte quantity stored in the video quality detection buffer, a playback status of playing the target video on the video player; and
    determining, by the video playback quality detection apparatus, video playback quality of the target video based on the playback status.

2. The method according to claim 1, wherein the obtaining video frame data rate information corresponding to the target video comprises:
    obtaining video attribute information of the target video, and determining a video identifier of the target video based on the video attribute information; and
    when target decoded video information is obtained from a data rate information cloud server through matching based on the video identifier, determining the video frame data rate information corresponding to the target video based on the target decoded video information, wherein the data rate information cloud server comprises one or more groups of decoded video information, and one group of decoded information comprises at least a video identifier and video frame data rate information of one video.

3. The method according to claim 2, wherein when the target decoded video information is not obtained from the data rate information cloud server through matching based on the video identifier, the method further comprises:
    obtaining the video frame data rate information corresponding to the target video from a data rate information buffer, wherein the video frame data rate information is determined based on some or all decoded video frames corresponding to the target video and stored in a data rate information buffer, and the some or all decoded video frames corresponding to the target video are obtained by decoding video data comprised in some or all video data packets corresponding to the target video.

4. The method according to claim 3, wherein the video attribute information comprises a video encoding type, and the method further comprises:
    obtaining second video data comprised in a second video data packet corresponding to the target video;
    decoding the second video data based on the video encoding type, and determining, based on the decoded second video data, single frame data rate information of a plurality of video frames corresponding to the second video data packet; and
    storing the single frame data rate information of the plurality of video frames corresponding to the second video data packet in the data rate information buffer.

5. The method according to claim 4, wherein the decoded second video data comprises a plurality of decoded video frames, and the determining, based on the decoded second video data, single frame data rate information of a plurality of video frames corresponding to the second video data packet comprises:

performing the following operations on any decoded video frame i in the plurality of decoded video frames:
obtaining a picture data rate byte quantity and an audio data rate byte quantity that are comprised in the decoded video frame i;
combining the picture data rate byte quantity and the audio data rate byte quantity into a single frame data rate byte quantity corresponding to the decoded video frame i;
obtaining a frame identifier corresponding to the decoded video frame i, and determining a data rate information identifier corresponding to the decoded video frame i based on the frame identifier corresponding to the decoded video frame i; and
determining the single frame data rate information of the plurality of video frames corresponding to the second video data packet based on each single frame data rate byte quantity corresponding to each of the plurality of decoded video frames and each data rate information identifier corresponding to each decoded video frame.

6. The method according to claim 3, wherein the method further comprises:
transmitting the video frame data rate information of the target video and stored in the data rate information buffer to the data rate information cloud server, to store, in the data rate information cloud server, the video frame data rate information corresponding to the target video.

7. The method according to claim 1, wherein the reducing, based on the video frame rate of the target video and the video frame data rate information of the target video, the buffer byte quantity stored in the video quality detection buffer comprises:
at an expiration of a first reduction cycle determined based on the video frame rate, determining a first video frame of the target video corresponding to a start moment of the target video, and determining, based on the video frame data rate information of the target video, first single frame data rate information corresponding to the first video frame; and
obtaining a first data rate byte quantity comprised in the first single frame data rate information, and reducing the buffer byte quantity stored in the video quality detection buffer by a value corresponding to the first data rate byte quantity, to obtain the reduced buffer byte quantity stored in the video quality detection buffer.

8. The method according to claim 7, wherein the reducing, based on the video frame rate of the target video and the video frame data rate information of the target video, the buffer byte quantity stored in the video quality detection buffer comprises:
at an expiration of a second reduction cycle after the first reduction cycle, determining a second data rate information identifier based on a first data rate information identifier comprised in the first single frame data rate information, and determining, based on the second data rate information identifier, second single frame data rate information from the video frame data rate information corresponding to the target video; and
obtaining a second data rate byte quantity comprised in the second single frame data rate information, and reducing the buffer byte quantity stored in the video quality detection buffer by a value corresponding to the second data rate byte quantity, to obtain the reduced buffer byte quantity stored in the video quality detection buffer.

9. The method according to claim 1, wherein the playback status comprises a stalling state, and the determining, based on the reduced buffer byte quantity stored in the video quality detection buffer, the playback status of playing the target video on the video player comprises:
when the reduced buffer byte quantity stored in the video quality detection buffer is less than or equal to a stalling byte quantity threshold, determining that the playback status of the target video is the stalling state.

10. The method according to claim 9, wherein the determining video playback quality of the target video based on the playback status comprises:
when it is determined that the playback status of the target video is the stalling state, determining a quantity of stalling times that corresponds to the target video; and
when the quantity of stalling times that corresponds to the target video is greater than or equal to a first preset quantity threshold, or when the quantity of stalling times that corresponds to the target video is greater than or equal to a second preset quantity threshold at an expiration of a preset detection period, determining that the video playback quality of the target video is poor.

11. The method according to claim 9, wherein when it is determined that the playback status of the target video is the stalling state, the method further comprises:
stopping reducing, based on the video frame rate of the target video and the video frame data rate information of the target video, the buffer byte quantity stored in the video quality detection buffer;
when the buffer byte quantity stored in the video quality detection buffer is greater than or equal to a fluent byte quantity threshold, determining to switch the playback status of the target video from the stalling state to a fluent state, and continuing reducing, based on the video frame rate of the target video and the video frame data rate information of the target video, the buffer byte quantity stored in the video quality detection buffer; and
updating total stalling duration of the target video based on duration of switching the playback status of the target video from the stalling state to the fluent state; and
the determining video playback quality of the target video based on the playback status comprises:
when the total stalling duration of the target video is greater than or equal to first preset stalling duration, or when the total stalling duration of the target video is greater than or equal to second preset stalling duration at the expiration of a preset detection period, determining that the playback quality of the target video is poor.

12. A video playback quality detection apparatus, comprising:
a processor; and
a memory storing a program, which when the program is executed by the processor, causes the video playback quality detection apparatus to:
obtain a first video data packet of a target video from a bearer network, the bearer network is a network between a video resource server and a video player that is used for transmission of the target video;
obtain a data byte quantity of first video data in the first video data packet, and update a buffer byte quantity stored in a video quality detection buffer based on the data byte quantity, wherein the bearer network is a network between the video resource server and the video player and transmits the target video, and the target video comprises a plurality of video data packets comprising the first video data packet, wherein the data byte quantity is a number of data bytes of the first video data included in the first video data packet, and wherein the buffer byte quantity indicates a data byte quantity of video data that has been downloaded from the bearer network to the video playback quality detection apparatus by the video playback quality detection apparatus and that is not reduced by simulating video playback performed by the video player;

obtain video frame data rate information corresponding to the target video, and reduce, based on a video frame rate of the target video and the video frame data rate information of the target video, the buffer byte quantity stored in the video quality detection buffer, wherein the video frame data rate information comprises single frame data rate information corresponding to each of some or all video frames in the target video, and the single frame data rate information corresponding to any video frame comprises at least a data rate byte quantity and a data rate information identifier that correspond to said any video frame;

determine, based on the buffer byte quantity that is stored in the video quality detection buffer, a playback status of playing the target video on the video player; and determine video playback quality of the target video based on the playback status.

13. The video playback quality detection apparatus according to claim 12, wherein when the program is executed by the processor, the video playback quality detection apparatus is further caused to:

obtain video attribute information of the target video, and determine a video identifier of the target video based on the video attribute information; and when target decoded video information is obtained from a data rate information cloud server through matching based on the video identifier, determine the video frame data rate information corresponding to the target video based on the target decoded video information, wherein the data rate information cloud server comprises one or more groups of decoded video information, and one group of decoded information comprises at least a video identifier and video frame data rate information of one video.

14. The detection apparatus according to claim 13, wherein the video playback quality detection apparatus comprises a data rate information buffer, and when the program is executed by the processor, the video playback quality detection apparatus is further caused to:

obtain the video frame data rate information corresponding to the target video from a data rate information buffer, wherein the video frame data rate information is determined based on some or all decoded video frames corresponding to the target video and stored in the data rate information buffer, and the some or all decoded video frames corresponding to the target video are obtained by decoding video data comprised in some or all video data packets corresponding to the target video.

15. The detection apparatus according to claim 14, wherein the video attribute information comprises a video encoding type, and when the program is executed by the processor, the video playback quality detection apparatus is further caused to:

obtain second video data comprised in a second video data packet corresponding to the target video;

decode the second video data based on the video encoding type, and determine, based on the decoded second video data, single frame data rate information of a plurality of video frames corresponding to the second video data packet; and store the single frame data rate information of the plurality of video frames corresponding to the second video data packet in the data rate information buffer.

* * * * *